(12) United States Patent
Yotsuyanagi

(10) Patent No.: US 8,031,381 B2
(45) Date of Patent: Oct. 4, 2011

(54) IMAGE READING APPARATUS FOR SHOW-THROUGH AND FOUNDATION COLOR REDUCTION

(75) Inventor: Satomi Yotsuyanagi, Kawasaki (JP)

(73) Assignee: Canon Denshi Kabushiki Kaisha, Tokyo (JP)

( * ) Notice: Subject to any disclaimer, the term of this patent is extended or adjusted under 35 U.S.C. 154(b) by 1102 days.

(21) Appl. No.: 11/771,110

(22) Filed: Jun. 29, 2007

(65) Prior Publication Data

US 2008/0007801 A1 Jan. 10, 2008

(30) Foreign Application Priority Data

Jun. 30, 2006 (JP) ................................ 2006-182462

(51) Int. Cl.
*H04N 1/46* (2006.01)

(52) U.S. Cl. ........ 358/505; 358/530; 358/502; 358/518; 358/523; 358/500; 428/211.1; 428/219; 428/409; 347/16; 347/104; 347/15; 347/218

(58) Field of Classification Search .................. 358/400, 358/471, 474, 500, 505, 530, 502, 523, 501, 358/507, 518, 1.9; 250/559.28; 428/211.1, 428/219, 409; 347/16, 104, 15, 218

See application file for complete search history.

(56) References Cited

U.S. PATENT DOCUMENTS

| 5,138,178 A * | 8/1992 | Wong et al. ............... 250/559.28 |
| 5,637,383 A * | 6/1997 | Sakurai et al. ............. 428/211.1 |
| 2002/0071131 A1 * | 6/2002 | Nishida .......................... 358/1.9 |

FOREIGN PATENT DOCUMENTS

JP  2005-192153  7/2005

OTHER PUBLICATIONS

Fujisaki, Image Reading Apparatus, Dec. 5, 2003, JP-2003348301.*

* cited by examiner

*Primary Examiner* — Benny Tieu
*Assistant Examiner* — Martin Mushambo
(74) *Attorney, Agent, or Firm* — Fitzpatrick, Cella, Harper & Scinto

(57) ABSTRACT

An image reading apparatus which is capable of appropriately performing show-through reduction processing and foundation color reduction processing in accordance with an operation for changing the color of a background member to another one having different color that is read along with an original. An image reading unit reads an image of a conveyed original. A background member has a white-colored member and a black-colored member and is disposed in such a manner that it opposed to the image reading unit. A moving unit moves the background member. A CPU determines a degree of image processing to be applied to read image data depending on the color of an opposing portion of the background member, which is opposed to the image reading unit that is reading an original.

18 Claims, 13 Drawing Sheets

FIG. 5A

|  | $r_R$ | $r_G$ | $r_B$ |
|---|---|---|---|
| WHEN WHITE-COLORED MEMBER IS USED | $r_{WR}$ | $r_{WG}$ | $r_{WB}$ |

FIG. 5B

|  | $r_R$ | $r_G$ | $r_B$ |
|---|---|---|---|
| WHEN BLACK-COLORED MEMBER IS USED | $r_{BR}$ | $r_{BG}$ | $r_{BB}$ |

FIG. 11A

|  | $r_R$ | $r_G$ | $r_B$ |
|---|---|---|---|
| SHEET THICKNESS a | $r_{aWR}$ | $r_{aWG}$ | $r_{aWB}$ |
| SHEET THICKNESS b | $r_{bWR}$ | $r_{bWG}$ | $r_{bWB}$ |
| SHEET THICKNESS c | $r_{cWR}$ | $r_{cWG}$ | $r_{cWB}$ |

FIG. 11B

|  | $r_R$ | $r_G$ | $r_B$ |
|---|---|---|---|
| SHEET THICKNESS a | $r_{aBR}$ | $r_{aBG}$ | $r_{aBB}$ |
| SHEET THICKNESS b | $r_{bBR}$ | $r_{bBG}$ | $r_{bBB}$ |
| SHEET THICKNESS c | $r_{cBR}$ | $r_{cBG}$ | $r_{cBB}$ |

IMAGE READING APPARATUS FOR SHOW-THROUGH AND FOUNDATION COLOR REDUCTION

BACKGROUND OF THE INVENTION

1. Field of the Invention

The present invention relates to an image reading apparatus and, more particularly, to an image reading apparatus configured to perform show-through reduction processing and foundation color reduction processing while reading an image from an original having images on both sides thereof.

2. Description of the Related Art

Conventionally, in image reading apparatuses such as scanners and facsimile machines, a background member which is read along with an original is provided in such a manner that it faces an image reading unit in order to form a background image formed with an image of the original. The color of the background member is typically chosen to be a white color similar to the foundation color of the original in order to maintain color fidelity of a white portion of the read image.

When both sides of a double-sided thin original are read using the white background member, printed information on the opposite side of the original can be seen through the original and a so-called show-through phenomenon is occurred. In order to solve the problem, a histogram is formed for each color component, a color to be removed from a read image is detected by using the histogram, and image processing is applied depending on the result of the detection. This can prevent show-through in a read image.

On the other hand, when an image of a original is read using a black background member, there is a problem that a margin area of the read image which has a color corresponding to the foundation color of the original is darkened because the contrast is reduced. To solve the problem, foundation color reduction processing is performed by using a histogram similar to those mentioned above to remove the color of the margin area (see for example Japanese Laid-Open Patent Publication (Kokai) No. 2005-192153).

However, the conventional image reading apparatus has a problem that the foundation color reduction processing cannot be performed until an image reading of at least one original is completed because it uses a histogram generated on the basis of an image read from the original to detect the foundation color. Another problem with the conventional image reading apparatus that uses histograms in show-through reduction processing and foundation color reduction processing is that the apparatus requires a memory for generating the histograms in addition to a memory for storing read images.

SUMMARY OF THE INVENTION

The present invention provides an image reading apparatus capable of appropriately performing show-through reduction processing and foundation color reduction processing in accordance with an operation for changing a background member to another one having different color that is read along with an original. The present invention also provides an image reading apparatus capable of performing improved processing using a histogram to perform foundation color reduction processing or show-through reduction processing.

In a first aspect of the present invention, there is provided an image reading apparatus comprising an image reading unit adapted to read an image of a conveyed original, a background member having a white-colored portion which is substantially white and another portion which has a different color from the white-colored portion and adapted to be able to be opposed to said image reading unit, a moving unit adapted to move said background member, and a determining part adapted to determine a degree of image processing to be applied to read image data depending on the color of an opposing portion of said background member, the opposing portion being opposed to said image reading unit that is reading an original.

The image processing can be foundation color reduction processing and said determining part can determine a degree of foundation color reduction processing to be applied to read image data depending on the color of the opposing portion of said background member.

The degree of the foundation color reduction processing can be determined on the basis of a predetermined correction coefficient and the correction coefficient is set in association with the color of the opposing portion of said background member.

The background member can have a black-colored portion which is substantially black in addition to the white-colored portion.

The correction coefficient can include a value used when the opposing portion of said background member is the white-colored portion and a value used when the opposing portion of said background member is the black-colored portion which has substantially black color.

The image processing can be show-through reduction processing and said determining part can determine the degree of the show-through reduction processing applied to read image data depending on the color of the opposing portion of said background member.

In a second aspect of the present invention, there is provided an image reading apparatus comprising an image reading unit adapted to read an image of a conveyed original, a background member having a white-colored portion which is substantially white and another portion which has a different color from the white-colored portion and adapted to be able to be opposed to said image reading unit, a moving unit adapted to move said background member, a sheet thickness detecting section adapted to output an output signal corresponding to a sheet thickness of a conveyed original, and a determining part adapted to determine a degree of image processing to be applied to read image data depending on the color of an opposing portion of said background member which is opposed to said image reading unit that is reading an original and depending on the sheet thickness corresponding to the output signal of said sheet thickness detecting section.

The image processing can be foundation color reduction processing and said determining part determines the degree of the foundation color reduction processing to be applied to read image data depending on the color of the opposing portion of said background member and the sheet thickness corresponding to the output signal of said sheet thickness detecting section.

The determining part can raise the degree of the foundation color reduction processing higher when the sheet thickness corresponding to the output signal of said sheet thickness detecting section becomes thinner and reduce the degree of the foundation color reduction processing lower when the sheet thickness corresponding to the output signal of said sheet thickness detecting section becomes thicker.

The degree of the foundation color reduction processing can be determined on the basis of a predetermined correction coefficient and the correction coefficient can be set in association with the color of the opposing portion of said background member and the sheet thickness corresponding to the output signal of said sheet thickness detecting section.

The background member can include a white-colored portion which is substantially white and a black-colored portion which is substantially black.

The correction coefficient can include a value used when the opposing portion of said background member is the white-colored portion and a value used when the opposing portion of said background member is the black-colored portion which is substantially black.

The image processing can be show-through reduction processing and the degree of the show-through reduction processing applied to read image data can be determined depending on the color of the opposing portion of said background member and the sheet thickness corresponding to the output signal of said sheet thickness detecting section.

The sheet thickness detecting section can include a sensor emitting part and a sensor receiving part.

The sheet thickness detecting section can include one of an infrared sensor and an ultrasonic sensor.

The degree of the image processing can be settable from the outside of the image reading apparatus.

In a third aspect of the present invention, there is provided an image reading apparatus comprising an image reading unit adapted to read an image of a conveyed original, a background member having a white-colored portion which is substantially white and another portion which has a different color from the white-colored portion and adapted to be able to be opposed to said image reading unit, a moving unit adapted to move said background member, and a selecting part adapted to select a type of image processing to be applied to read image data, and said moving unit moves said background member depending on the type of image processing selected by said selecting part.

The image reading apparatus can further comprise a sheet thickness detecting section adapted to output an output signal corresponding to the sheet thickness of a conveyed original, and a determining part adapted to determine a degree of image processing to be applied to read image data depending on the color of an opposing portion of said background member that is opposed to said image reading unit that is reading an original and depending on the sheet thickness corresponding to the output signal of said sheet thickness detecting section.

In a fourth aspect of the present invention, there is provided an image reading apparatus comprising an image reading unit adapted to read an image of a conveyed original, a plurality of background members including a white-colored background member having at least a white-colored portion which is substantially white and another background member at least having a portion of a color different from that of the white-colored portion and are adapted to be able to be opposed to said image reading unit, a moving unit adapted to move at least one of said white-colored background member and said another background member, and a determining part adapted to determine a degree of image processing to be applied to read image data depending on the color of an opposing portion of said background member that is opposed to said image reading unit that is reading an original.

The image reading apparatus can further comprise a sheet thickness detecting section adapted to output an output signal corresponding to the sheet thickness of a conveyed original, and a determining part adapted to determine a degree of image processing to be applied to read image data depending on the color of an opposing portion of said background member that is opposed to said image reading unit that is reading an original and depending on the sheet thickness corresponding to the output signal of said sheet thickness detecting section.

In a fourth aspect of the present invention, there is provided an image reading apparatus comprising an image reading unit adapted to read an image of a conveyed original, a background member having a white-colored portion which is substantially white and another portion which has a different color from the white-colored portion and adapted to be able to be opposed to said image reading unit, a moving unit adapted to move at least one of said background member and said image reading unit so as to change the relative positions of said background member and said image reading unit, and a determining part adapted to determine a degree of image processing to be applied to read image data depending on the color of an opposing portion of said background member that is opposed to said image reading unit that is reading an original.

The image reading apparatus can further comprise a sheet thickness detecting section adapted to output an output signal corresponding to the sheet thickness of a conveyed original, and a determining part adapted to determine a degree of image processing to be applied to read image data depending on the color of an opposing portion of said background member that is opposed to said image reading unit that is reading an original and depending on the sheet thickness corresponding to the output signal of said sheet thickness detecting section.

According to the present invention, the color of the background image formed with image data of an original is changed by moving the background members with white and other colors that are read along with the original. The degree of image processing to be applied to the read image data is determined depending on the color of the opposing portion of the background member that is opposed to the image reading unit in reading the original. Thus, an appropriate degree of image processing such as show-through reduction processing and foundation color reduction processing can be determined in accordance with the color of each background member used in the image reading. Therefore, the show-through reduction processing and foundation color reduction processing can be appropriately performed in accordance with the operation for changing the color of the background member that is read along with an image of the original. Also, it is possible to perform improved processing when a histogram is used to perform foundation color reduction processing.

Further features of the present invention will become apparent from the following detailed description of exemplary embodiments with reference to the attached drawings.

BRIEF DESCRIPTION OF THE DRAWINGS

FIG. 5A is a diagram showing a correction coefficient table for foundation color reduction (table for white-colored member) referred to in the foundation color reduction processing in FIG. 4, and FIG. 5B is a diagram showing another correction coefficient table for foundation color reduction (table for black-colored member) referred to in the foundation color reduction processing in FIG. 4.

FIG. 11A is a diagram showing a correction coefficient table for foundation color reduction (table for white-colored member) referred to at step S86 or S87 of FIG. 8, and FIG. 11B shows another correction coefficient table for foundation color reduction (table for black-colored member) referred to at step S86 or S87 of FIG. 8.

DETAILED DESCRIPTION OF THE PREFERRED EMBODIMENTS

The present invention will now be described in detail below with reference to the accompanying drawings showing a preferred embodiment thereof.

Figure 1:
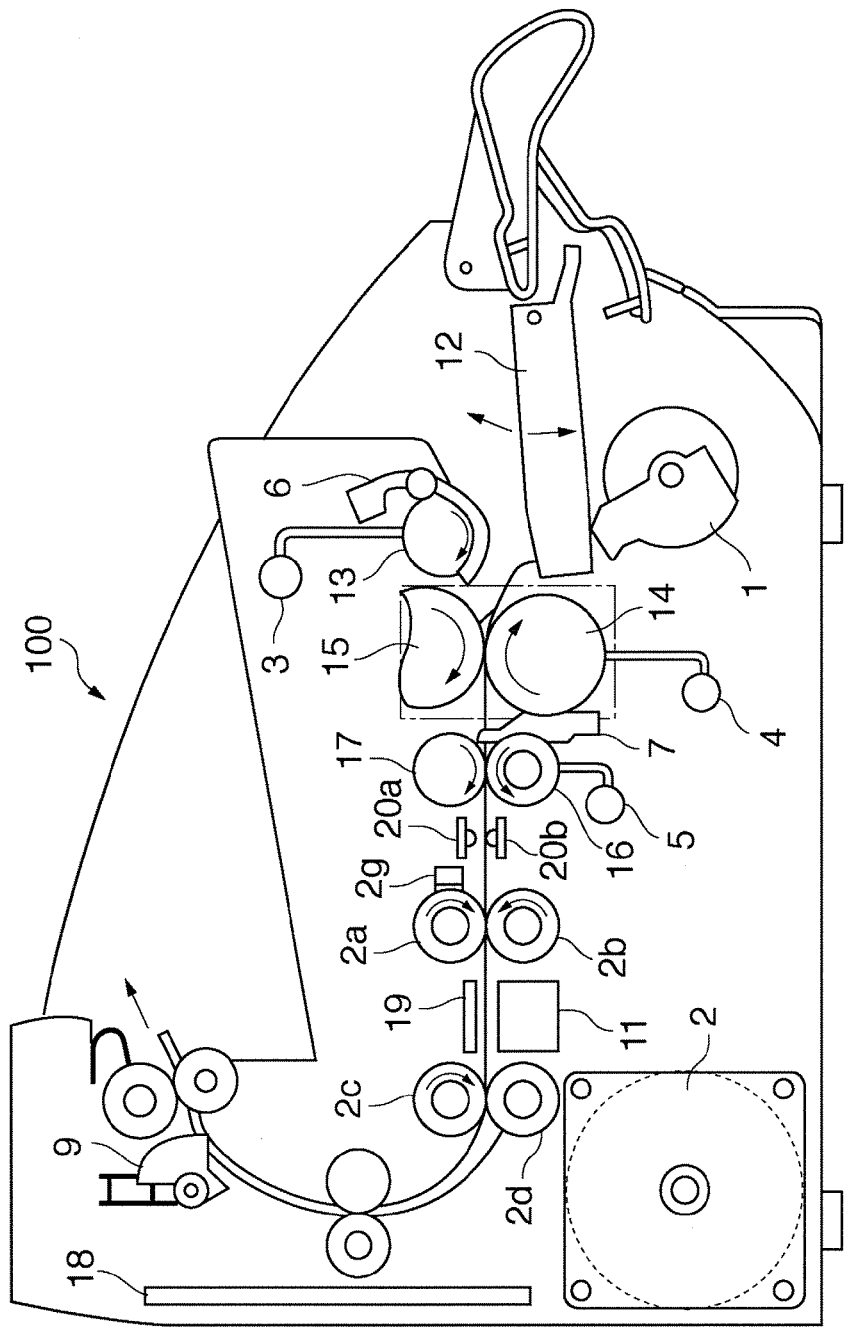
FIG. 1 is a cross-sectional view showing a configuration of an image reading apparatus according to a first embodiment of the present invention.

FIG. 1 is a cross-sectional view showing a configuration of an image reading apparatus according to a first embodiment of the present invention.

The image reading apparatus 100 in FIG. 1 is comprised of a original tray 12 on which an original is to be placed, a original tray motor 1 which moves the original tray 12 up and down, a sheet feed sensor 6 which detects the presence of an original on the original tray 12, and a main motor 2 which drives plural rollers of the image reading apparatus 100 through a power transmission mechanism, not shown.

The image reading apparatus 100 is also comprised of a pickup roller clutch 3, a pickup roller 13 driven by the main motor 2 to pick up an original when the pickup roller clutch 3 transmits power to it, a feed roller 15 driven by the main motor 2 to feed the original at the top of originals picked up from the original tray 12 by the pickup roller 13, a retard roller clutch 4, and a retard roller 14 which conveys originals other than the one at the top in the direction opposite to the conveying direction to separate the originals when the retard roller clutch 4 transmits power to it. The image reading apparatus 100 is also comprised of a registration sensor 7 which detects the leading and trailing edges of an original, a registration roller pair 16 and 17 driven by the main motor 2 to convey an original when a registration roller clutch 5 transmits power to them and a sheet thickness detecting section 20 which has a sensor emitting part 20a and a sensor receiving part 20b and outputs an output signal corresponding to the thickness of the leading edge portion of an original. The image reading apparatus 100 is further comprised of an image reading unit 11 which reads an image from an original fed to it, an original detect sensor 2g which detects the leading edge and trailing edge of an original at a position upstream to the image reading unit 11, a controller board 18 on which components such as a CPU 3c, which will be described later, are provided, a background member 19 provided in the vicinity of the image reading unit 11, conveying rollers 2a to 2d driven by the main motor 2 to convey an original, and a discharge sheet sensor 9 provided in the vicinity of a sheet discharge section to which an original is discharged for detecting the leading and trailing edges of the original.

Figure 2:
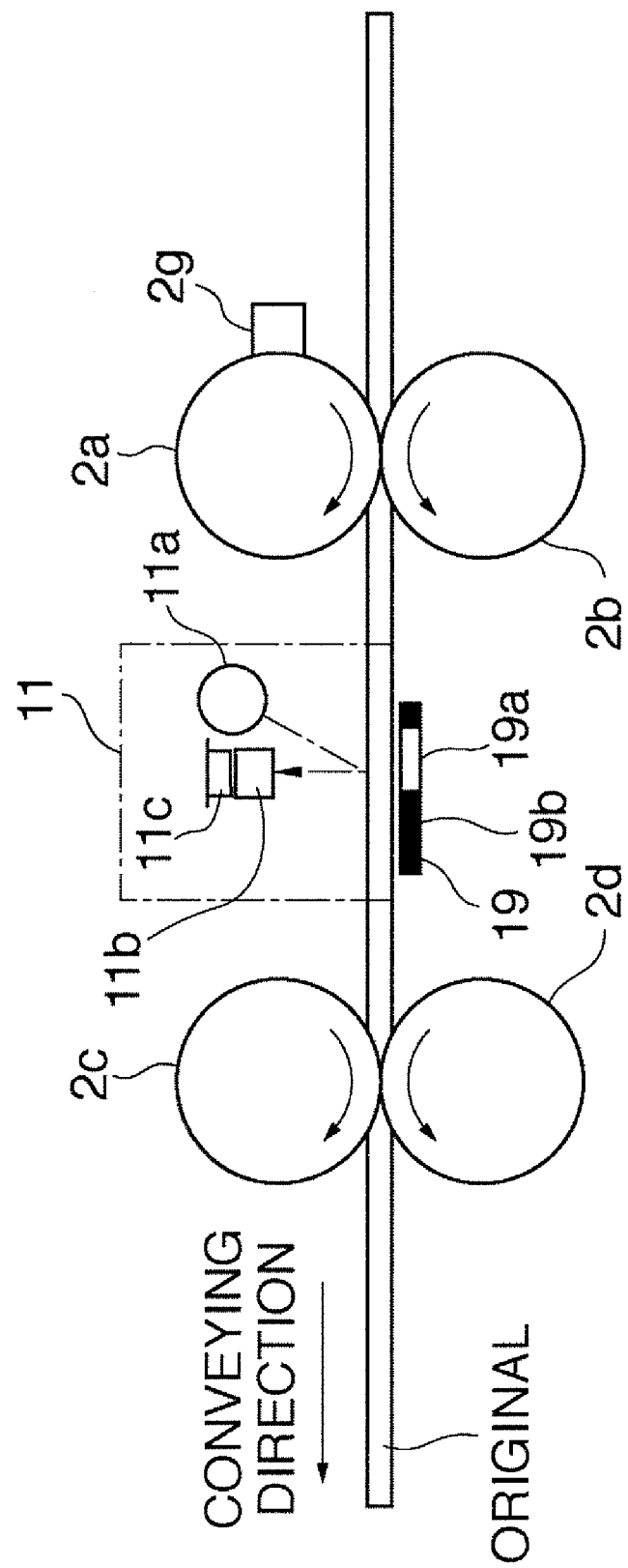
FIG. 2 is a diagram showing an internal configuration of an image reading unit shown in FIG. 1 and its surrounding components.

FIG. 2 is a diagram showing an internal configuration of the image reading unit 11 shown in FIG. 1 and its surrounding components.

As shown in FIG. 2, the image reading unit 11 includes an LED light source 11a, a SELFOC lens 11b, and a line sensor 11c. The image reading unit 11 illuminates the surface of an original with light from the LED light source 11a and causes light reflected from the original to enter the line sensor 11c through the SELFOC lens 11b, thereby reading an image on the surface of the original. The background member 19 is disposed in such a manner that it faces the image reading unit 11 in order to form a background color of a surrounding portion contained in image data of an original read by the image reading unit 11 from an original. The background member 19 is composed of a white-colored member 19a having a white color and a black-colored member 19b having a black color, which are configured as an combined member. A moving unit, not shown, which is connected to the background member 19, is controlled by the CPU 3c described later and moves the background member 19 back and forth along a sub-scanning direction. When an original is not in an image reading light path of the image reading unit 11, light reflected from the background member 19 enters the line sensor 11c. The background member 19 is moved along a sub-scanning direction by the moving unit to position the white-colored member 19a (white-colored portion) or the black-colored member 19b (black-colored portion) of the background member 19 in the image reading light path of the image reading unit 11.

Figure 3:
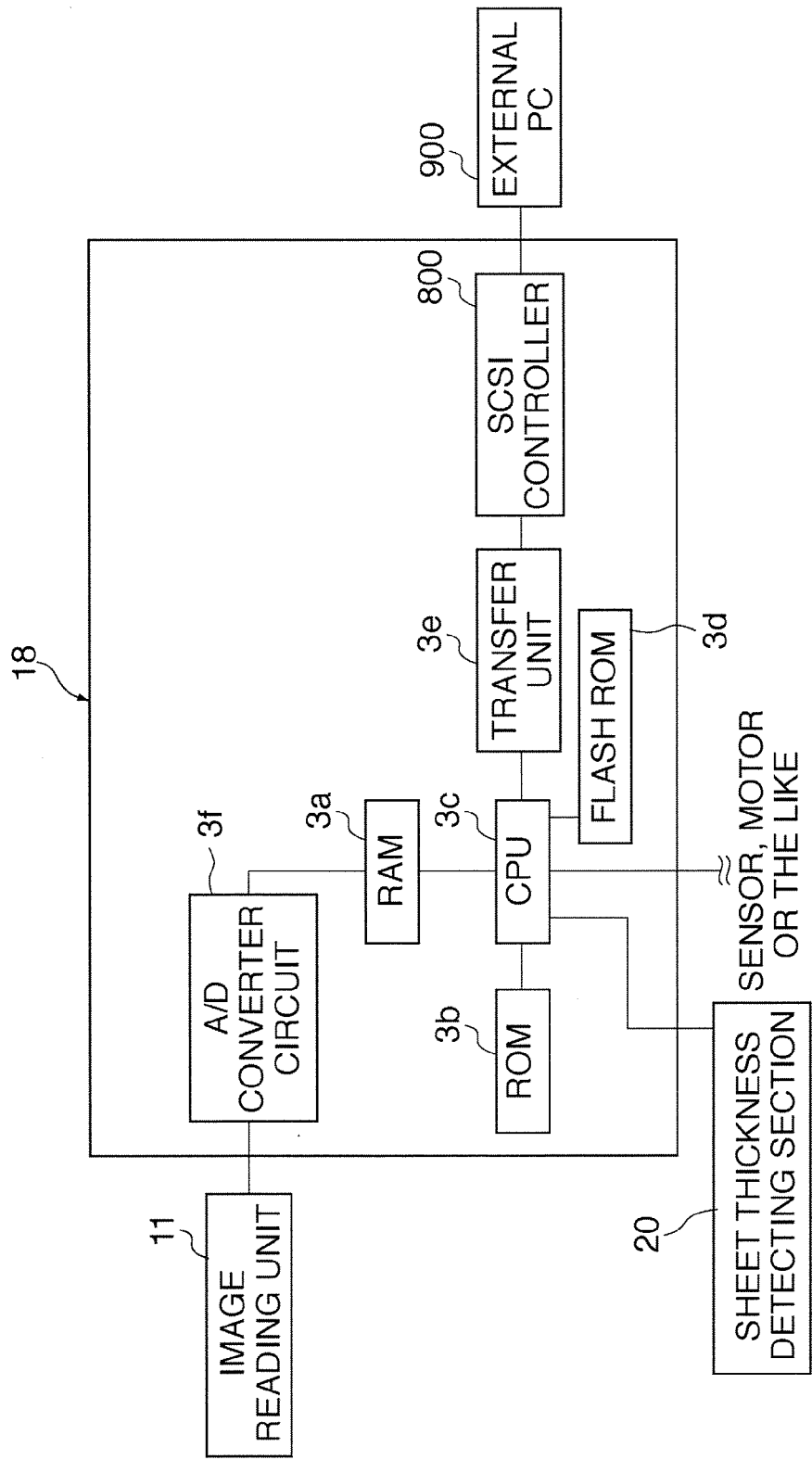
FIG. 3 is a block diagram showing a configuration of a controller board shown in FIG. 1.

FIG. 3 is a block diagram showing a configuration of the controller board 18 shown in FIG. 1.

The controller board 18 in FIG. 3 includes an A/D converter circuit 3f which converts an output from the image reading unit 11 into digital data, a RAM 3a for temporarily storing read image data as digital data, a ROM 3b for storing programs used in the image reading apparatus 100 and a program for performing foundation color reduction processing, which will be described later, a flash ROM 3d for storing dark current data and white reference data, which are correction data specific to the image reading apparatus, a CPU 3c which controls the entire image reading apparatus 100 in accordance with a program stored in the ROM 3b, and a transfer unit 3e. The CPU 3c may be composed of some separate semiconductor devices.

When the CPU 3c reads and sends image data temporarily stored in the RAM 3a to the transfer unit 3e, the transfer unit 3e transfers the image data to an external personal computer (PC) 900 through a SCSI controller 800. When a SCSI command to read an image is sent from the external PC 900 through the SCSI controller 800 to the transfer unit 3e, the transfer unit 3e transfers the SCSI command to the CPU 3c. The sheet thickness detecting section 20 is connected to the CPU 3c and outputs an output signal corresponding to a detected sheet thickness to the CPU 3c.

Figure 4:
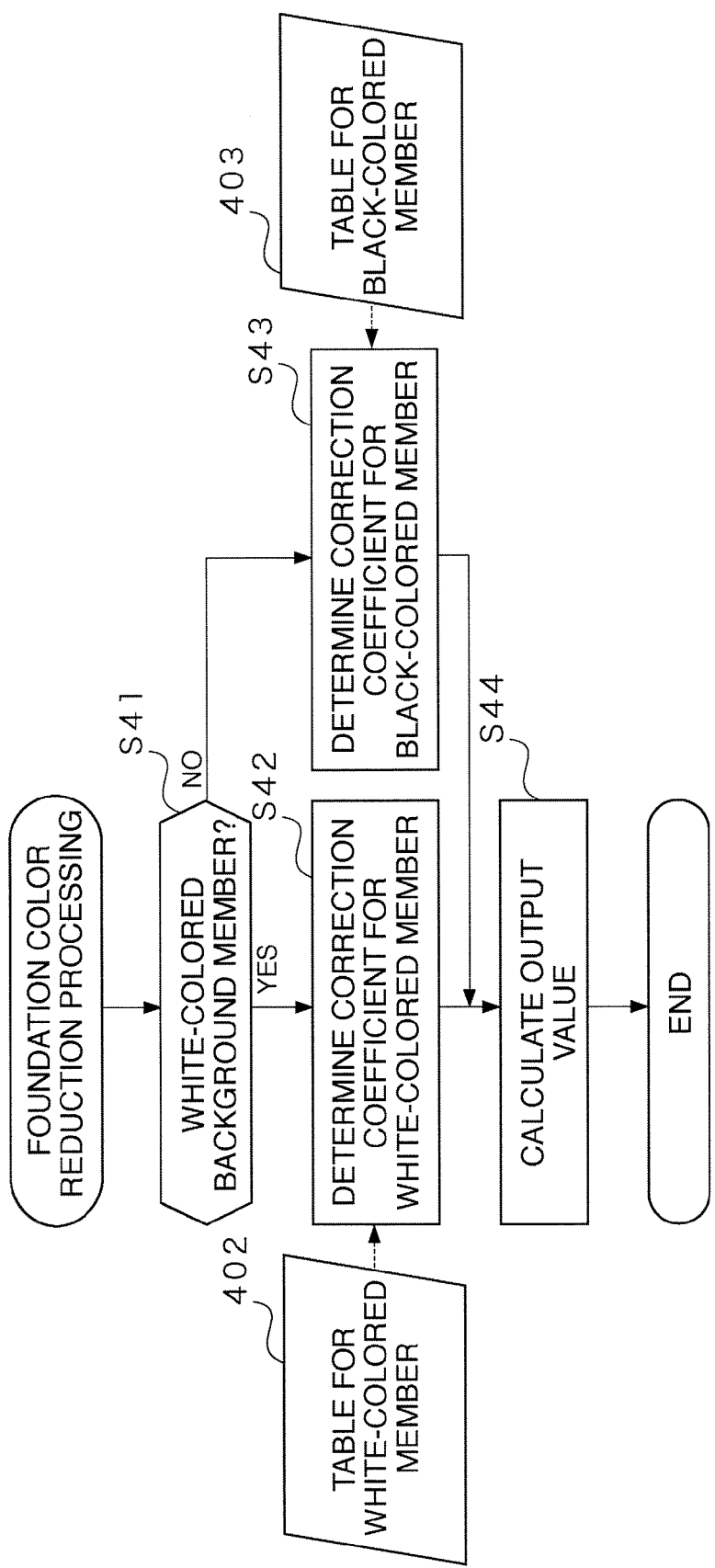
FIG. 4 is a flowchart of foundation color reduction processing performed by a CPU shown in FIG. 3.

FIG. 4 is a flowchart of foundation color reduction processing performed by the CPU 3c in FIG. 3.

In FIG. 4, first, it is determined whether or not the white-colored portion 19a is positioned in the image reading light path of the image reading unit 11, that is, whether or not the background member in the image reading light path has been switched to the white-colored member 19a (step S41). If the background member in the image reading light path has been switched to the white-colored member 19a, a foundation color reduction correction coefficient table for the white-colored member (hereinafter simply referred to as the "table for white-colored member") 402 as shown in FIG. 5A and described later is referenced to determine correction coefficients ($\gamma_R$, $\gamma_G$, $\gamma_B$) (step S42). If the background member has not been switched to the white-colored member 19a, in other words, if the background member has been switched to the black-colored member 19b, the foundation color reduction correction coefficient table for the black-colored member (hereinafter simply referred to as the "table for black-colored member") 403 as shown in FIG. 5B and described later is referenced to determine correction coefficients ($\gamma_R$, $\gamma_G$, $\gamma_B$) (step S43). Then, the determined correction coefficients and input values (the intensity of the three primary colors) R, G, and B for each pixel of the image data are used to calculate output values (the intensity of the three primary colors) R', G', and B' for the pixel of the image data after image processing from the following expression (1) (step S44), then the process is terminated. It is assumed here that R, G, and B can take a value in the range from 0 to 255 and the larger the value, the brighter the color.

$$\left. \begin{array}{l} R' = R + \gamma_R * (R*G*B)/255\char`^3 \\ G' = G + \gamma_G * (R*G*B)/255\char`^3 \\ B' = B + \gamma_B * (R*G*B)/255\char`^3 \end{array} \right\} \quad (1)$$

FIG. 5A is a diagram showing a correction coefficient tables for foundation color reduction (table for white-colored member 402) referred to in the foundation color reduction processing shown in FIG. 4, and FIG. 5B is a diagram showing a correction coefficient tables for foundation color reduction (table for black-colored member 403) referred to in the foundation color reduction processing shown in FIG. 4.

As shown in FIGS. 5A and 5B, when the white portion of the background member is in the image reading light path, the correction coefficients ($\gamma_R$, $\gamma_G$, $\gamma_B$) are chosen to be correction coefficients for white-colored member ($\gamma_{WR}$, $\gamma_{WG}$, $\gamma_{WB}$) on the basis of the table for white-colored member 402. When the black portion of the background member is in the image reading light path, the correction coefficients ($\gamma_R$, $\gamma_G$, $\gamma_B$) are chosen to be correction coefficients for black-colored member ($\gamma_{BR}$, $\gamma_{BG}$, $\gamma_{BB}$) on the basis of the table for black-colored member 403.

Figure 6A:
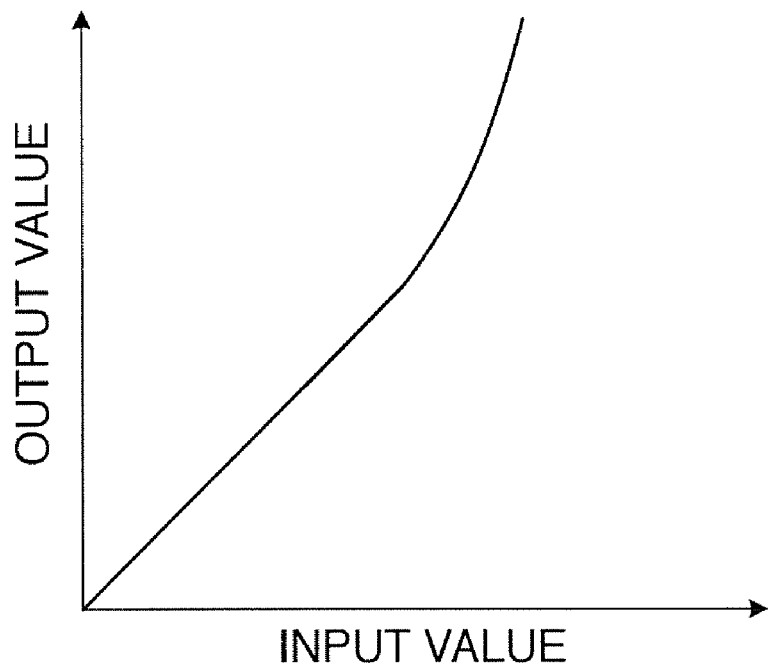
FIG. 6A is a diagram showing the relationship between an input value for one of the three primary colors R, G, and B and its corresponding output value R', G', or B' when a black-colored member is used.
Figure 6B:
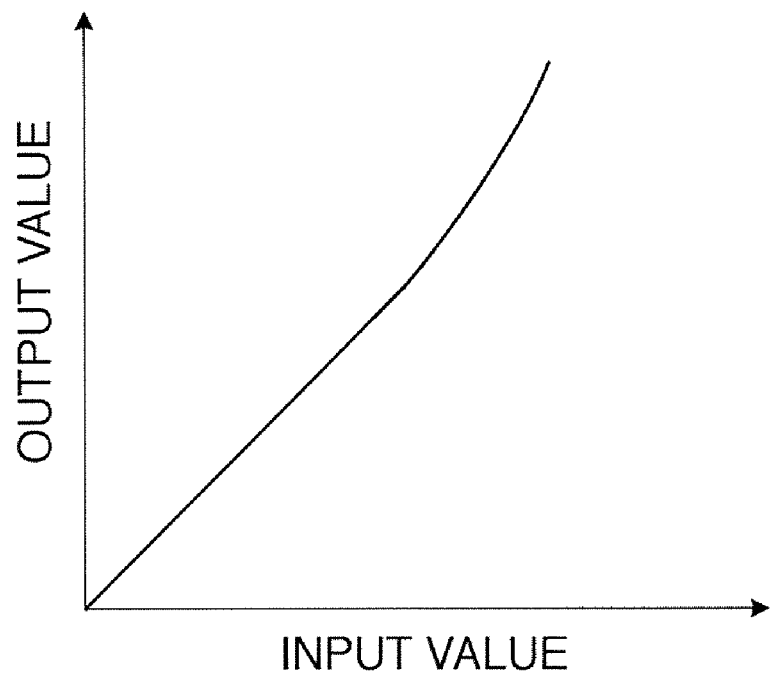
FIG. 6B is a diagram showing the relationship between an input value for one of the three primary colors R, G, and B and its corresponding output value R', G', or B' when a white-colored member is used.

FIG. 6 is a diagram showing the relationship between an input value R, G, and B of one of the three primary colors and its corresponding output value (R', G', B') when a black-colored member 19b is used, and FIG. 6B is a diagram showing the relationship between an input value for one of the three primary colors R, G, and B and its corresponding output value R', G', or B' when a white-colored member 19a is used. It should be noted that different correction curves can be applied by separately setting $\gamma_R$, $\gamma_G$, $\gamma_B$ for each of the three primary colors.

As shown in FIGS. 6A and 6B, the correction coefficient used for correcting a image read using the black-colored member 19b is set to a larger value than the correction coefficient used for correcting an image read by using the white-colored member 19a to make a higher degree of correction in order to raise the degree of foundation color reduction processing. This is because the contrast decreases and read image data is generally dark (nearly gray) when the black-colored member 19b is used. That is, input values of R, G, and B when the black-colored member 19b is used are smaller than input values of R, G, and B when the white-colored member 19a is used.

In contrast, when the white-colored member 19a is used in image reading, a high degree correction can cause so-called whiteout (saturation of white portion) and the fidelity of image data can be lost. If a high degree correction is executed on reduced values of image data in order to prevent white out, show-through can occur in which an image, such as printed characters, on the back side of a sheet is visible. Therefore, the correction coefficients are set to small values when the white-colored member 19a is used.

If the input values R, G, and B are used to calculate (R*G*B) and the result of the calculation obtained when using the black-colored member 19b is denoted by $(R*G*B)_b$ and that obtained when using the white-colored member 19a is denoted by $(R*G*B)_w$, the read image generally exhibits the relationship $(R*G*B)_b \leq (R*G*B)_w$. Thus, referring to the expression (1) for correction given earlier, it can be seen that the correction coefficients $\gamma_R$, $\gamma_G$, and $\gamma_B$ must be large in order to cause the foundation color to approach the color of the original, which is white, when the black-colored member 19b is used. Therefore, the correction coefficients ($\gamma_{BR}$, $\gamma_{BG}$, $\gamma_{BB}$) for the black-colored member are set to values greater than the correction coefficients ($\gamma_{WR}$, $\gamma_{WG}$, $\gamma_{WB}$) for the white-colored member.

Figure 7:
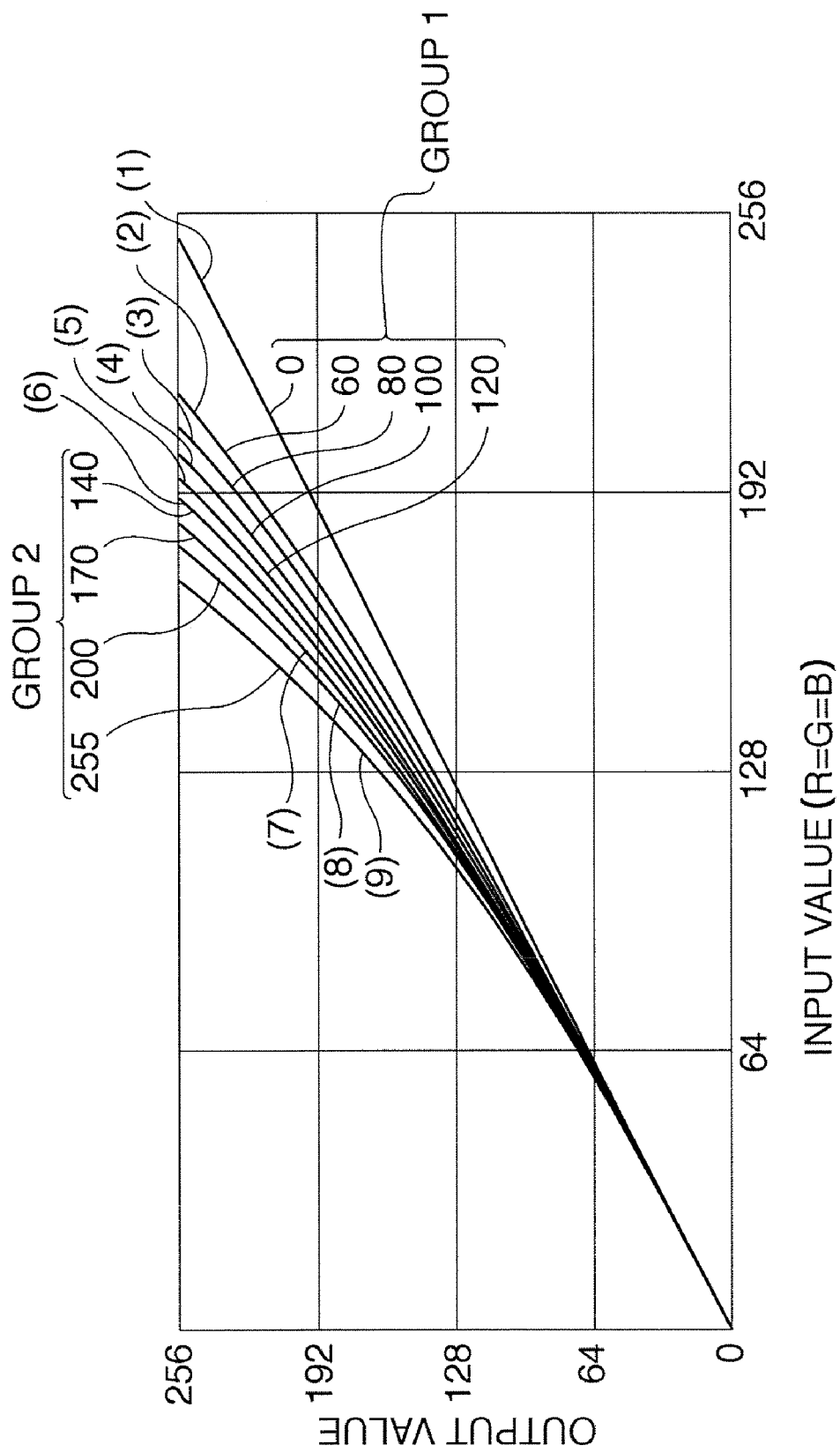
FIG. 7 is a diagram showing an example of the relationship between an input value R, G, and B and its corresponding output value R', G', B' after foundation color reduction processing when the white-colored member is used, where the input values R, G, B satisfy R=G=B and a correction coefficient γ is a predetermined value such as 0, 60, . . . , 200, 255.

FIG. 7 is a diagram showing an example of the relationship between input values R, G, and B and their corresponding output values R', G', B' after the foundation color reduction processing, where the input values R, G, and B satisfy R=G=B in the expression (1) and the correction coefficient $\gamma$ is a predetermined value.

In FIG. 7, plots of values obtained by assigning values in group 1 (0, 60, 80, 100, and 120) to the correction coefficient $\gamma$ are denoted by (1) to (5) and plots of values obtained by assigning values in group 2 (140, 170, 200, and 255) to the correction coefficient $\gamma$ are denoted by (6) to (9). In the embodiment, output values in the range represented by plots (1) to (5) can be provided when the white-colored member 19a is used to read an image whereas output values in the range represented by plots (6) to (9) can be provided when the black-colored member 19b is used to read an image.

The correction coefficient $\gamma$ may be a user-specified value. In that case, limits may be placed on the range of selectable values depending on the color of the background member. When switching is made from the white-colored member 12a to the black-colored member 12b and when any of the values in group 1 has been used as the correction coefficient $\gamma$ in order to read an image by using the white-colored member 12a as the background member, the correction coefficient $\gamma$ may be automatically changed to any of the values in group 2. On the contrary, when switching is made from the black-colored member 12b to the white-colored member 12a, the correction coefficient $\gamma$ may be automatically changed from any value in group 2 to any value in group 1.

According to the embodiment, the background member 19 made up of the white-colored member 19a and the black-colored member 19b is moved to change the color of the background which is a surrounding portion contained in image data read in image reading of original. When the image reading unit 11 reads an original, correction coefficients are determined by using the table for white-colored member 402 or table for black-colored member 403 depending on the color of the background member 19 facing the image reading unit 11 and the determined correction coefficients and input values are used to calculate output values. Therefore, an appropriate correction coefficient used in foundation color reduction processing can be determined that is suitable for the color of the background member, and foundation color reduction processing can be appropriately performed in accordance with an operation for switching the color of the background member used in reading an image from an original. In this embodiment, above mentioned expression (1) may be changed to other expressions which work on similar principle.

Figure 8:
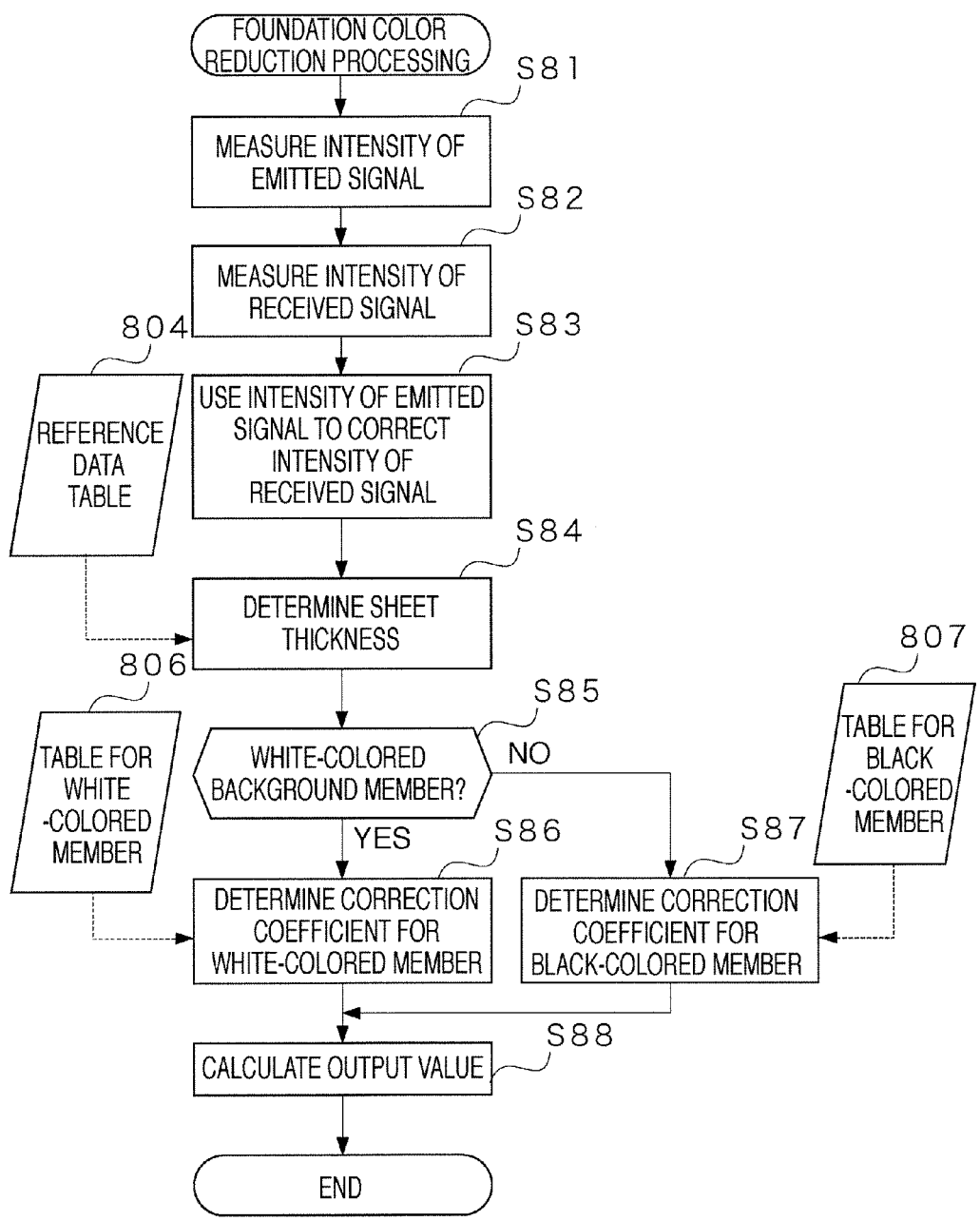
FIG. 8 is a flowchart of foundation color reduction processing performed by an image reading apparatus according to a second embodiment of the present invention.

FIG. 8 is a flowchart of foundation color reduction processing performed by an image reading apparatus according to a second embodiment of the present invention. The configuration of the second embodiment is the same as that of the first embodiment except that sheet thickness determination is added to perform the foundation color reduction processing performed in the first embodiment.

Figure 10:
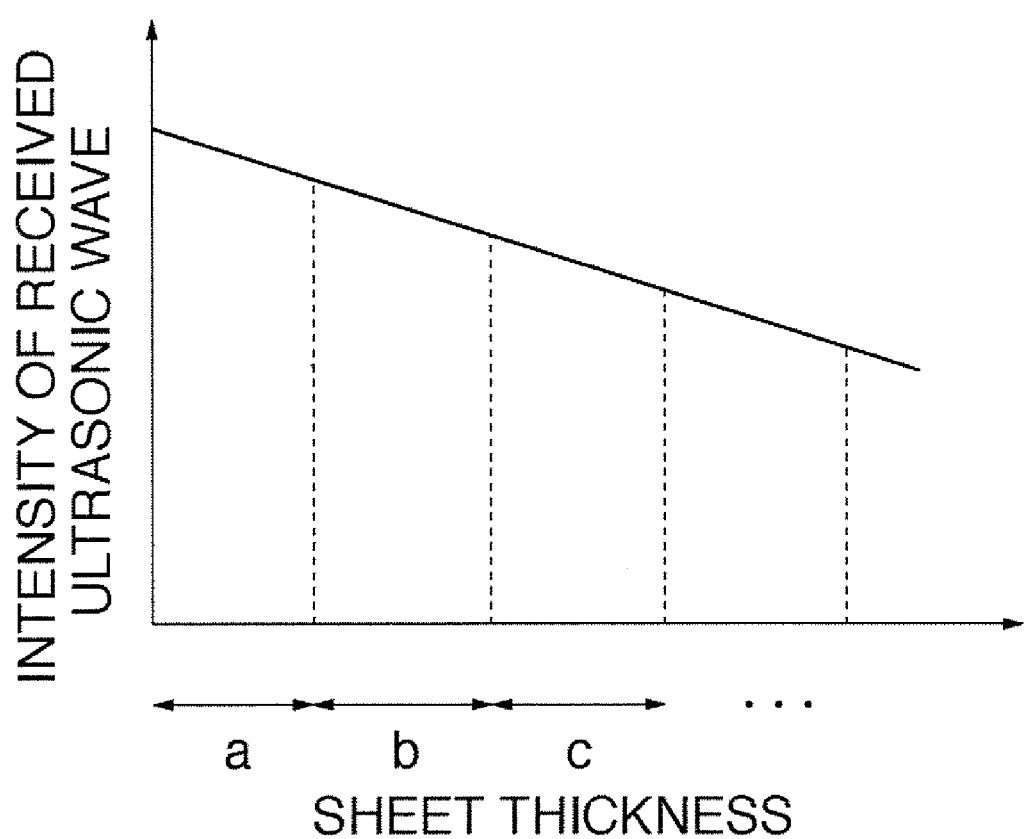
FIG. 10 is a graph representing a reference data table referred to at step S84 of FIG. 8.

In FIG. 8, the intensity of ultrasonic wave emitted by a sensor emitting part of a sheet thickness detecting section 20 is measured first (step S81). For example, the intensity of ultrasonic wave emitted by the sensor emitting part is measured on the basis of the intensity of an output signal outputted by a sensor receiving part that received the ultrasonic wave in the absence of an original. Then, an original is conveyed and an ultrasonic wave is emitted from the emitting part to the original. The ultrasonic wave that has passed through the original is received by the receiving part and the intensity of a received signal corresponding to the received ultrasonic wave intensity is measured (step S82). Then, the ratio of the intensity of the received signal to measured intensity of the emitted ultrasonic wave mentioned above (or the difference between measured intensity of the emitted ultrasonic wave and the intensity of the received signal) is calculated. Alternatively, the intensity of the received signal is corrected in accordance with the degree by which measured intensity of ultrasonic wave emitted has changed from a reference value (step S83). If it is expected that the intensity of ultrasonic wave emitted will not significantly vary from one use environment to another or with time, an uncorrected received signal intensity itself may be used. A reference data table 804 storing the above-mentioned ratios, differences, or the intensities of received signal for the thicknesses of originals is then referred to, and the sheet thickness of the original is determined on the basis of the ratio, difference, or corrected intensity of the received signal (step S84). The data in the reference data table 804 is represented by a graph as shown in FIG. 10 described later. The reference data table 804 represented by a graph as shown in FIG. 10 is used when the sheet thickness (a, b, c, ... ) is determined from the corrected intensity of the received signal. When the ratio or difference mentioned above is used, a different reference data table is used.

Then, it is determined whether or not a white-colored member 19a is positioned in an image reading light path of an image reading unit 11, that is, whether or not the background member in the image reading light path has been switched to the white-colored member 19a (step S85). If the background member in the image reading light path has been switched to the white-colored member 19a, a table for white-colored member 806 as shown in FIG. 11A described later is referred to determine correction coefficients ($\gamma_R$, $\gamma_G$, $\gamma_B$) on the basis of the sheet thickness determined at the step S84 (step S86). If the background member is switched to the black-colored member 19b, a table for black-colored member 807 as shown in FIG. 11B described later is referred to determine correction coefficients ($\gamma_R$, $\gamma_G$, $\gamma_B$) on the basis of the sheet thickness determined at the step S84 (step S87). Then, the correction coefficients and input values R, G, and B are used to calculate output values R', G', and B' in accordance with the expression (1) given earlier (step S88), and then the process is terminated.

Figure 9:
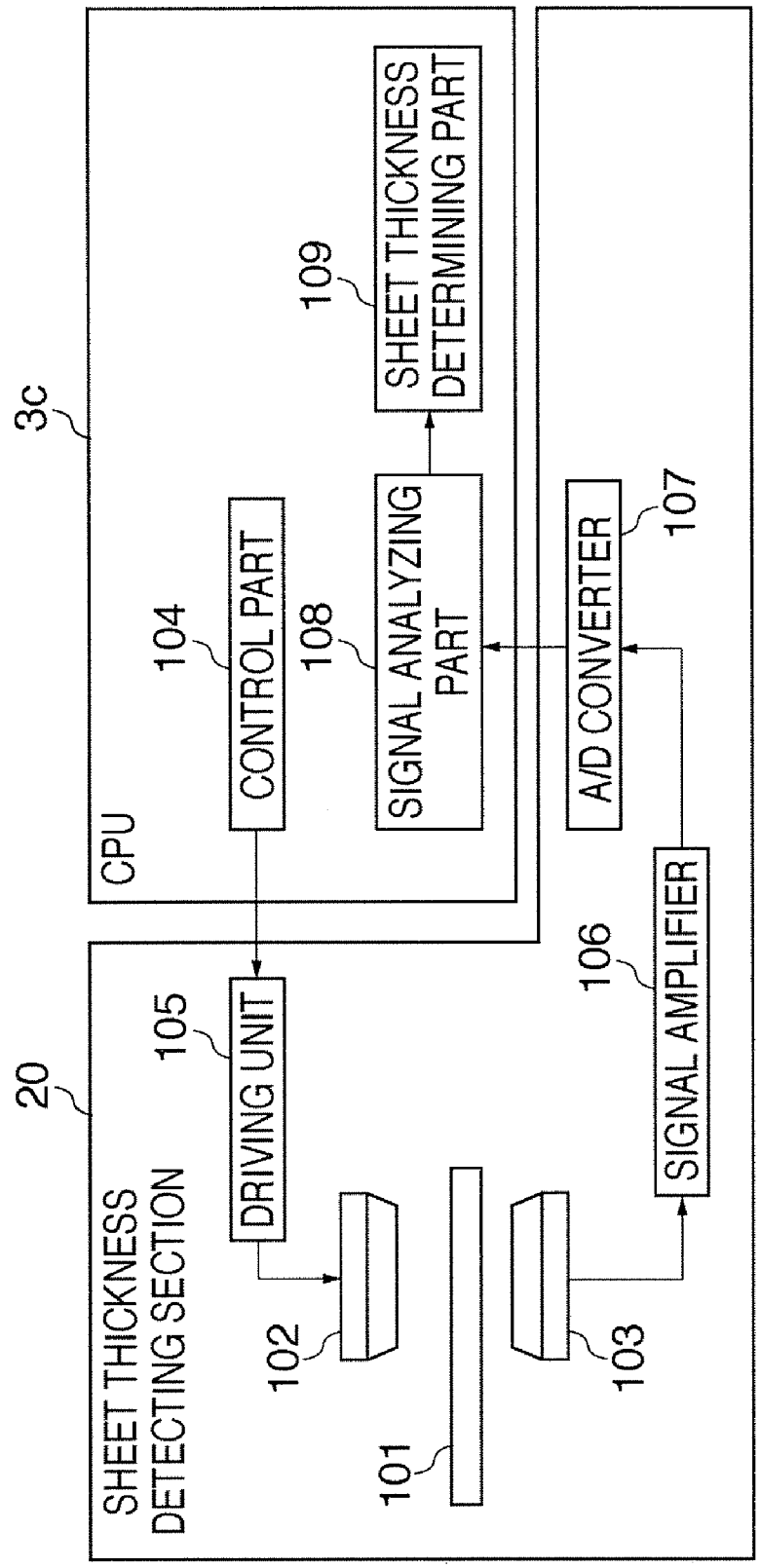
FIG. 9 is a block diagram schematically showing a configuration of a sheet thickness detecting section and a CPU in an example in which an ultrasonic sensor is used in the sheet thickness detecting section in FIG. 3.

FIG. 9 is a block diagram schematically showing a configuration of the sheet thickness detecting section and a CPU 3c in an example in which an ultrasonic sensor is used in the sheet thickness detecting section 20 in FIG. 3.

In FIG. 9, reference numeral 101 denotes an original to be sensed, 102 denotes an ultrasonic wave emitting unit which emits an ultrasonic wave toward the original 101. Reference numeral 103 denotes an ultrasonic wave receiving unit which receives an ultrasonic wave emitted from the ultrasonic wave emitting unit 102. The ultrasonic wave receiving unit 103 is disposed to face the ultrasonic wave emitting unit 102 across a conveying path through which the original 101 is conveyed between them so as to receive the ultrasonic wave transmitted through the original 101. Reference numeral 104 denotes a control part which provides a pulse signal, which is a signal for generation of ultrasonic wave to a driving unit 105 described later. The driving unit 105 amplifies the pulse signal provided from the control part 104 and outputs the amplified pulse signal to drive the ultrasonic wave emitting unit 102. The ultrasonic wave emitting unit 102 emits an ultrasonic wave according to the amplified pulse signal to the ultrasonic wave receiving unit 103. The ultrasonic wave emitting unit 102 and the ultrasonic wave receiving unit 103 represent the sensor emitting part 20a and sensor receiving part 20b, respectively, of the sheet thickness detecting section 20.

Reference numeral 106 denotes a signal amplifier which amplifies an ultrasonic wave receive signal outputted from the ultrasonic wave receiving unit 103 and outputs the amplified ultrasonic wave receive signal to an A/D converter 107 described later. The signal amplifier is used because the amplitude of the ultrasonic wave receive signal outputted by the ultrasonic wave receiving unit 103 is small. When an original 101 is present between the ultrasonic wave emitting unit 102 and the ultrasonic wave receiving unit 103, an received ultrasonic wave is significantly attenuated. Therefore, the weak ultrasonic wave receive signal is amplified to an amplitude that enables determination of the sheet thickness of the original.

Reference numeral 107 denotes the A/D converter which converts an ultrasonic wave receive signal (analog signal) amplified by the signal amplifier 106 to a digital signal and outputs it to a signal analyzing part 108. Also a detected amplitude signal of received ultrasonic wave generated by any rectifying amplitude detector circuit may be generated and may be converted by the A/D converter 107 to a digital signal. Reference numeral 108 denotes the signal analyzing part which analyzes the amplitude of a digitized ultrasonic wave receive signal representing the intensity of a ultrasonic wave receive signal or a digitized detected amplitude signal and outputs the result of the analysis to a sheet thickness determining part 109. The sheet thickness determining part 109 determines the thickness of a sheet of original on the basis of the result of analysis performed by the signal analyzing part 108.

FIG. 10 is a graph representing the reference data table 804 referred to at step S84 of FIG. 8. It is assumed that the intensity of received ultrasonic wave has been corrected by taking into account variations in the intensity of emitted ultrasonic wave or the like caused by environmental alteration.

Referring to FIG. 10, ultrasonic waves received by the ultrasonic wave receiving unit 103 that have passed through thicker original are more attenuated than ultrasonic waves that have passed through thinner original. Accordingly, the intensities become smaller as shown in range "c", for example. Therefore, the range in which the thickness of an original 101 falls can be determined by the signal analyzing part 108 comparing the intensity of a ultrasonic wave received by the ultrasonic wave receiving unit 103 with a value contained in the reference data table 804. The sheet thickness determination in FIG. 8 can be performed using the intensity of the received ultrasonic wave passing through the leading edge portion of the original that is equivalent to an area several image-scan lines long from the leading edge of the original.

FIG. 11A is a diagram showing a correction coefficient table for foundation color reduction (table for white-colored member) referred to at step S86 or S87 of FIG. 8, and FIG. 11B shows another correction coefficient table for foundation color reduction (table for black-colored member) referred to at step S86 or S87 of FIG. 8.

As shown in FIGS. 11A and 11B, when the sheet thickness of an original being conveyed is in range "a" shown in FIG. 10 and the white-colored background member is in the image reading light path, the correction coefficients ($\gamma_R$, $\gamma_G$, $\gamma_B$) are chosen to be white-colored member correction coefficients ($\gamma_{aWR}$, $\gamma_{aWG}$, $\gamma_{aWB}$) on the basis of the table for white-colored member 806. When the thickness of an original being conveyed is in range "a" shown in FIG. 10 and the black-colored background member is in the image reading light path, the correction coefficients ($\gamma_R$, $\gamma_G$, $\gamma_B$) are chosen to be black-colored member correction coefficients ($\gamma_{aBR}$, $\gamma_{aBG}$, $\gamma_{aBB}$). Similarly, when the thickness of an original being conveyed is in range b or c shown in FIG. 10 and the white background member is in the image reading light path, the white-colored member correction coefficients are chosen to be ($\gamma_{bWR}$, $\gamma_{bWG}$, $\gamma_{bWB}$) or ($\gamma_{cWR}$, $\gamma_{cWG}$, $\gamma_{cWB}$). When the thickness of an original being conveyed is in range b or c shown in FIG. 10 and the black background member is in the image reading light path, the black-colored member correction coefficients are chosen to be ($\gamma_{bBR}$, $\gamma_{bBG}$, $\gamma_{bBB}$) or ($\gamma_{cBR}$, $\gamma_{cBG}$, $\gamma_{cBB}$).

The correction coefficients are set to smaller values for thicker originals and to greater values for thinner originals. Specifically, the relation among the correction coefficients are $\gamma_{aWR} > \gamma_{bWR} > \gamma_{cWR}$, $\gamma_{aWG} > \gamma_{bWG} > \gamma_{cWG}$, $\gamma_{aWB} > \gamma_{bWB} > \gamma_{cWB}$, or $\gamma_{aBR} > \gamma_{bBR} > \gamma_{cBR}$, $\gamma_{aBG} > \gamma_{bBG} > \gamma_{cBG}$, $\gamma_{aBB} > \gamma_{bBB} > \gamma_{cBB}$.

According to the embodiment, the background member 19 composed of the white-colored member 19a and the black-colored member 19b is moved to change the color of the background image portion that is the surrounding area contained in image data read from an original, and the sheet thickness of the original being conveyed is determined using the output signal of the sheet thickness detecting section 20. Correction coefficients are determined by using the table for white-colored member 806 or the table for the black-colored member 807 depending on the color of the background member 19 facing the image reading unit 11 and the sheet thickness corresponding to the output signal of the sheet thickness detecting section 20 while the image reading unit 11 is reading the original. The determined correction coefficients and input values are used to calculate output values. Therefore, appropriate correction coefficients used in foundation color reduction processing can be determined, and the foundation color reduction processing can be appropriately performed in accordance with an operation for switching the background member that is read along with the original.

In this embodiment, above mentioned expression (1) may be changed to other expressions which work on similar principle.

In this embodiment, correction coefficients ($\gamma_R$, $\gamma_G$, $\gamma_B$) is determined on the basis of the sheet thickness.

Alternatively, they may be determined on the basis of the intensity of received ultrasonic wave itself instead of sheet thickness and they are considered to be equivalent to those determined based on the sheet thickness.

Figure 12:
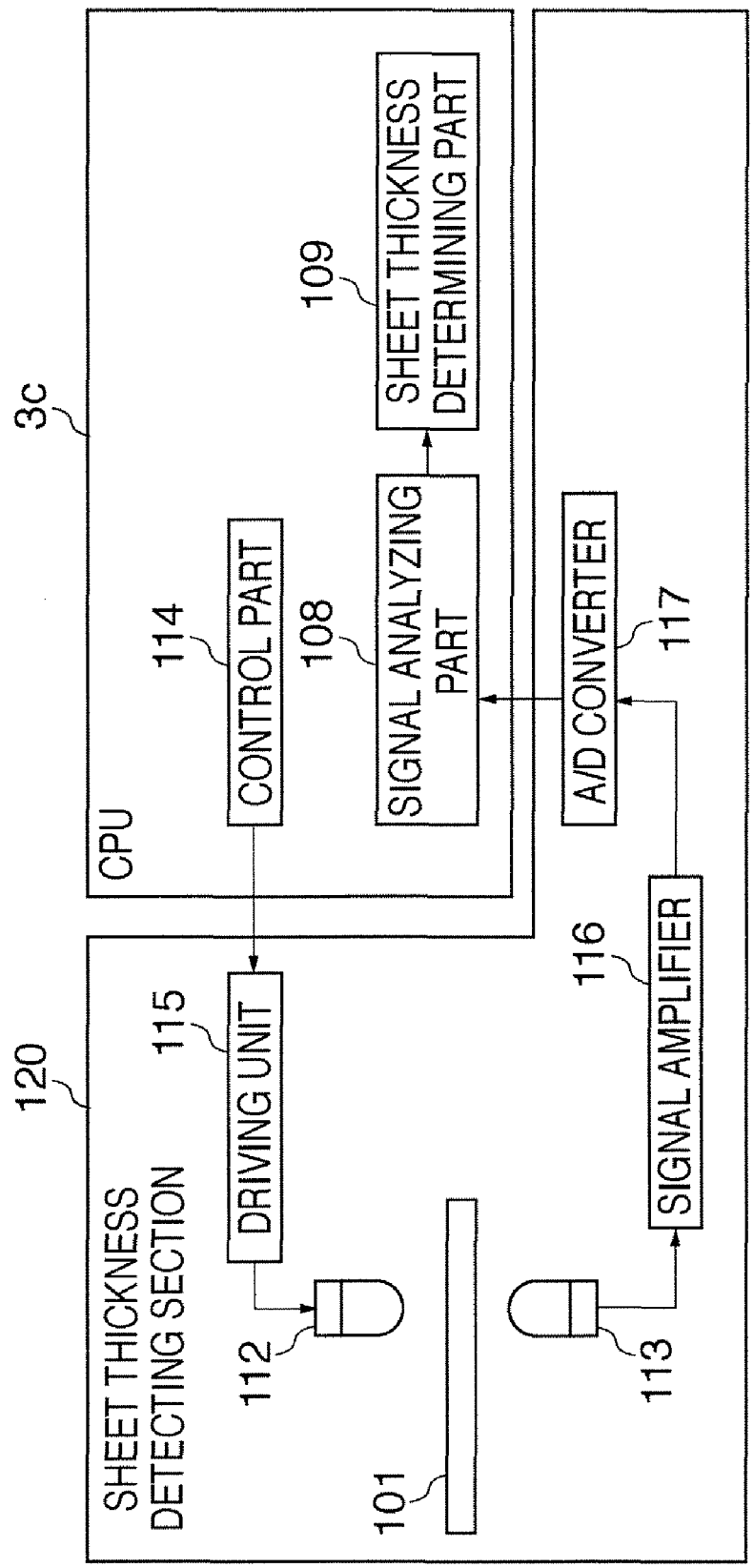
FIG. 12 is a block diagram schematically showing a configuration of a sheet thickness detecting section and a CPU of an image reading apparatus according to a third embodiment of the present invention.

FIG. 12 is a block diagram schematically showing a configuration of a sheet thickness detecting section and a CPU of an image processing apparatus according to a third embodiment of the present invention. Whereas the ultrasonic wave emitting unit 102 and the ultrasonic wave receiving unit 103 are provided in the second embodiment, an infrared sensor is provided as the sheet thickness detecting section in the third embodiment. Other component parts of the third embodiment are the same as those of the second embodiment.

In FIG. 12, reference numeral 112 denotes an infrared light emitting unit, which is an infrared light-emitting diode (infrared LED) irradiating an original 101 with infrared light. Reference numeral 113 denotes infrared light receiving unit, which is an infrared photo transistor receiving infrared light emitted from the infrared LED 112. The infrared photo transistor 113 is disposed to face the infrared LED 112 across a conveying path through which the original 101 is conveyed between them so as to receive infrared light that has passed through the original 101. The infrared LED 112 and the infrared photo transistor 113 provided in the sheet thickness detecting section 120 correspond to the sensor emitting part 20a and sensor receiving part 20b, respectively, of the sheet thickness detecting section 20.

An infrared photo diode which is a light-receiving element may be provided instead of the infrared photo transistor. In that case, a signal amplifier 116 must be used because an infrared light receive output signal from the infrared photo diode is weak. If an infrared photo transistor 113 is used, the signal amplifier 116 can be omitted.

Reference numeral 114 denotes a control part which provides an analog signal or an ON/OFF signal for emitting infrared light to a driving unit 115. The driving unit 115 drives the infrared LED 112 to emit light in accordance with the analog signal or ON/OFF signal provided from the control part 114.

An A/D converter 117 converts an infrared light receive output signal (analog signal) to a digital signal and outputs it to a signal analyzing part 108. The signal analyzing part 108 analyzes the infrared light receive output signal digitized by the A/D converter 117 and outputs the result of the analysis to a sheet thickness determining part 109.

Figure 13:
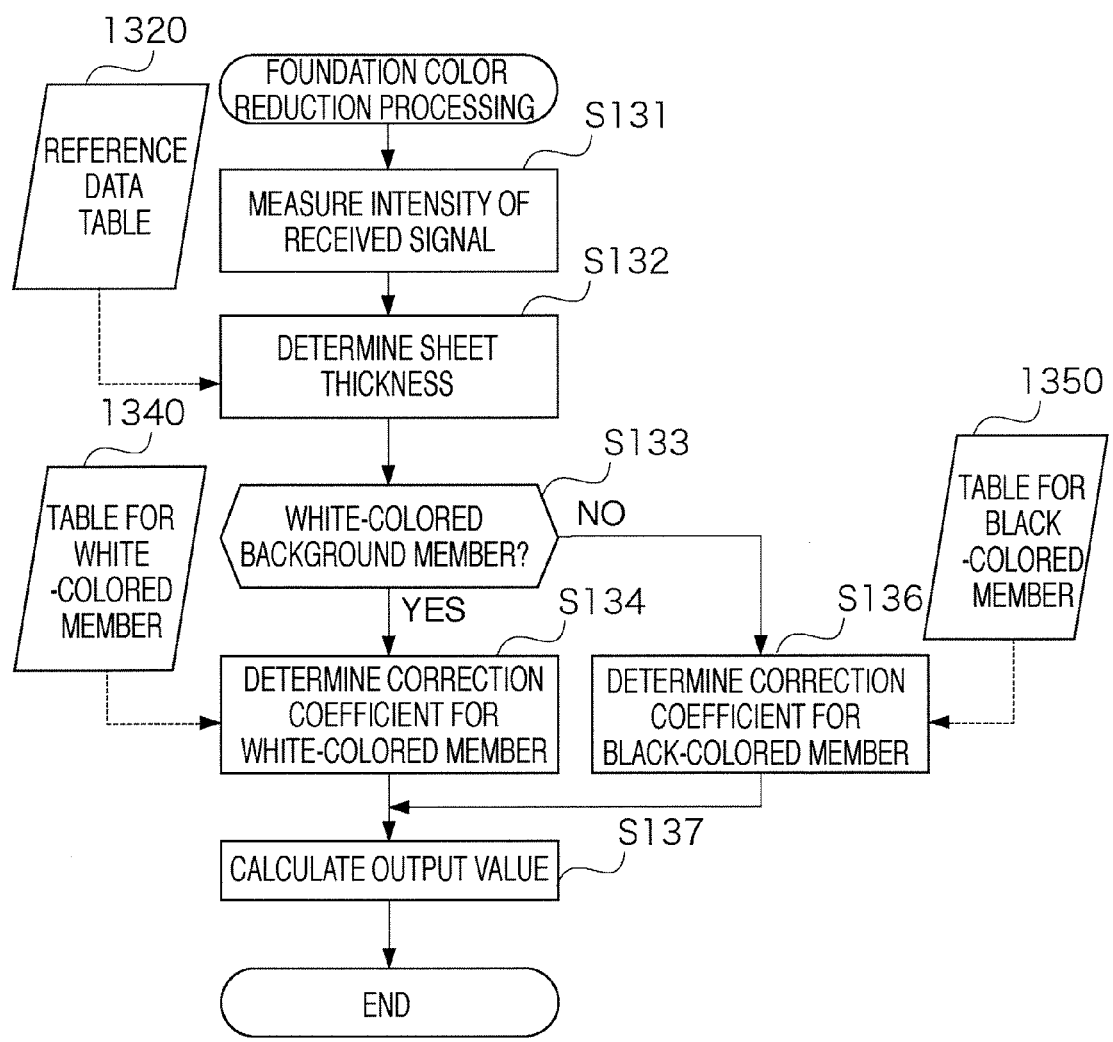
FIG. 13 is a flowchart of foundation color reduction processing performed by the image reading apparatus according to the third embodiment.

FIG. 13 is a flowchart of foundation color reduction processing performed by the image reading apparatus according to the third embodiment.

In FIG. 13, an original is first irradiated with infrared light from the infrared LED 112, infrared light passing through the original is received by the infrared photo transistor 113, and the received signal intensity is measured from the received infrared light (step S131). Then, a reference data table 1320 containing the received signal intensity associated with the thickness of the original is referred to and the sheet thickness of the original is determined on the basis of the received signal intensity (step S132). The reference data table 1320 is represented by a graph similar to the one shown in FIG. 10, in which a sheet thickness (a, b, c, . . . ) can be determined from a received signal intensity.

Then, it is determined whether or not the white-colored member 19a is positioned in the image reading light path of the image reading unit 11, that is, whether or not the color of the background portion is white (step S133). If the color of the background portion is white, a table for white-colored member 1340 similar to the one shown in FIG. 11(a) is referenced to determine correction coefficients ($\gamma_R, \gamma_G, \gamma_B$) on the basis of the sheet thickness determined at step S132 (step S134). Otherwise, that is, if the color of the background portion is black, a table for black-colored member 1350 similar to the one shown in FIG. 11B is referenced to determine correction coefficients ($\gamma_R, \gamma_G, \gamma_B$) on the basis of the sheet thickness determined at step S132 (step S135). Then, the determined correction coefficients and input values R, G, B are used to calculate output values R', G', B' from the above expression (1) (step S136) and then the process is terminated.

According to the third embodiment, the thickness of an original being conveyed is determined using the output signal of the sheet thickness detecting section 120. Correction coefficients are determined by using the table for white-colored member 1340 or the table for the black-colored member 1350 depending on the color of the background member 19 facing the image reading unit 11 and the sheet thickness determined using the signal intensity of the output signal of the sheet thickness detecting section 120 while the image reading unit 11 is reading the original. The determined correction coefficients and input values are used to calculate output values. Therefore, appropriate correction coefficients used in foundation color reduction processing can be determined and the foundation color reduction processing can be performed appropriately in accordance with an operation for switching the background member that is read along with the original. It should be noted that even if an original bears faint-colored printing such as a texture pattern, processing similar to the processing described above can be applied to remove the texture pattern or the like. The foundation color reduction processing of the present invention includes such texture pattern reduction processing.

In this embodiment, above mentioned expression (1) may be changed to other expressions which work on similar principle.

In this embodiment, correction coefficients ($\gamma_R, \gamma_G, \gamma_B$) is determined on the basis of the sheet thickness.

Alternatively, they may be determined on the basis of the intensity of received infrared light itself instead of sheet thickness and they are considered to be equivalent to those determined based on the sheet thickness.

While the image processing performed in the embodiments described above is foundation color reduction processing, this is not limitative. The image processing may be show-through reduction processing in which correction coefficients used in the show-through reduction processing are changed depending on the sheet thickness of an original and the color of the background member.

While correction coefficients are changed to values retrieved from a data table in the embodiments described above, numerical values used for calculating correction coefficient may be stored in a data table. Alternatively, multiple computation modules having different correction coefficients may be provided in a control program, for example, and one of the computation modules may be selected and used in accordance with the color of a background member.

If a histogram of an image or a local histogram of a partial image can be used, the correction coefficients or a computation module to use can be changed in accordance with information such as the density of foundation color that can be estimated from the histogram. For example, separate data tables may be provided that contain different values based on information such as the densities of foundation colors.

In the case where one of foundation color reduction processing or show-through reduction processing is selected by a selecting device or the like, the background member may be automatically moved so as to provide a background color suitable for the foundation color reduction processing or show-through reduction processing. Furthermore, correction coefficients used in the foundation reduction processing and show-through reduction processing may be determined or changed from an external device such as an external PC or input apparatus, not shown.

While the background member is automatically moved by a moving unit under the control of a CPU in the embodiments described above, the background member may be manually moved by a user. In that case, a message prompting the user to operate a manual mechanism to move the background member may be displayed on a display unit.

While the background member 19 that is composed of white and black-colored members 19a and 19b configured as an integral unit has been given as an example, this is not limitative, but the background member 19 may be composed of multiple members of different colors in addition to white. If two opposing image reading units are provided, the background members may be provided on the surface or inside of the opposite image reading unit.

While the background member 19 is driven by a driving unit, not shown, through a moving unit, not shown, to move along a sub-scanning direction to switch the color of the background member in the image reading optical path of the image reading unit 11, this is not limitative. At least one (for example a white-colored member) of white-colored member and member of other colors making up background members may be moved along the surface of another background member (for example black-colored member) to change the background color. Furthermore, the background member may be a plate member coated with a white or black film or painted white or black. In that case, the film or the paint itself should be considered as a background member. The movements of the background member include rotation, which may cause one of the differently colored surfaces of the background member to face the image reading unit. In that case, the background member may be in a shape such as a substantially plane shape, substantially polygonal prism shape, or substantially columnar shape, and the background member in such a shape may be coated with a white or black film as mentioned above.

In the case where the image reading unit is moved while the background member is fixed, an implementation in which at least one of the background member and the image reading unit is moved to change the relative positions of the background member and the image reading unit is also included in the present invention.

While the intensity of an emitted ultrasonic wave is measured on the basis of the intensity of a received signal that is received by a receiving part in the absence of an original in the embodiments described above, the present invention is not so limited. The intensity of an emitted ultrasonic wave may be measured from the intensity of a signal applied to the emitting part.

It is to be understood that the present invention may also be accomplished by supplying an image reading apparatus with a storage medium in which a program code of software, which realizes the functions of either of the above described embodiments is stored, and causing a computer (or CPU or MPU) of the image reading apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy® disk, a hard disk, a magnetic-optical disk, an optical disk such as a CD-ROM, a CD-R, a CD-RW, a DVD-ROM, a DVD-RAM, a DVD-RW and a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out from a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-182462, filed Jun. 30, 2006, which is hereby incorporated by reference herein in its entirety.

What is claimed is:

1. An image reading apparatus comprising:
an image reading unit adapted to read an RGB image of an original being conveyed;
a background member, comprising a first portion having a white color and a second portion having a different color from the white color, each of which is used to form a background color in the RGB image of the original read by said image reading unit;
a background color changing unit adapted to position said background member such that one of the first portion and the second portion is disposed opposite said image reading unit
a determining unit adapted to determine a correction coefficient for image processing to be performed on the RGB image, depending on which portion of said background member is disposed opposite said image reading unit and regardless of the original, wherein the correction coefficient and values of the RGB image uniquely define the image processing; and
wherein said image processing is performed using the following expression $$R' = R + \gamma_R \times \frac{(R \times G \times B)}{255^3}$$

$$G' = G + \gamma_G \times \frac{(R \times G \times B)}{255^3}$$

$$B' = B + \gamma_B \times \frac{(R \times G \times B)}{255^3}$$

for calculating an output value (R', G', B') for an input value (R, G, B) based on the correction coefficient ($\gamma_R$, $\gamma_G$, $\gamma_B$).

2. An image reading apparatus according to claim 1, wherein
the image processing comprises foundation color reduction processing, and
said determining unit determines the correction coefficient for the foundation color reduction processing.

3. An image reading apparatus according to claim 1, wherein the second portion has a black color.

4. An image reading apparatus according to claim 3, wherein the correction coefficient is greater for the second portion than for the first portion.

5. An image reading apparatus according to claim 3, wherein, when (R*G*B) for the second portion is denoted by $(R*G*B)_b$ and (R*G*B) for the first portion is denoted by $(R*G*B)_w$, the relationship $(R*G*B)_b \leqq$ and $(R*G*B)_w$ holds.

6. An image reading apparatus according to claim 1, wherein
the image processing comprises show-through reduction processing, and
said determining unit determines the correction coefficient for the show-through reduction processing.

7. An image reading apparatus comprising:
an image reading unit adapted to read an RGB image of an original being conveyed;
a background member, comprising a first portion having a white color and a second portion having a different color from the white color, each of which is used to form a background color in the RGB image of the original read by said image reading unit;
a background color changing unit adapted to position said background member such that one of the first portion and the second portion is disposed opposite said image reading unit;
a sheet thickness detecting unit adapted to detect a thickness of the original being conveyed
a determining unit adapted to determine a correction coefficient for image processing to be performed on the RGB image, depending on which portion of said background member is disposed opposite said image reading unit and the detected thickness of the original, wherein the correction coefficient and values of the RGB image uniquely define the image processing; and
wherein said image processing is performed using the following expression $$R' = R + \gamma_R \times \frac{(R \times G \times B)}{255^3}$$

$$G' = G + \gamma_G \times \frac{(R \times G \times B)}{255^3}$$

$$B' = B + \gamma_B \times \frac{(R \times G \times B)}{255^3}$$

for calculating an output value (R', G', B') for an input value (R, G, B) based on the correction coefficient ($\gamma_R$, $\gamma_G$, $\gamma_B$).

8. An image reading apparatus according to claim 7, wherein
the image processing comprises foundation color reduction processing, and
said determining unit determines the correction coefficient for the foundation color reduction processing.

9. An image reading apparatus according to claim 8, wherein said determining unit decreases the correction coefficient as the detected thickness is decreased, and increases the correction coefficient as the detected thickness is increased.

10. An image reading apparatus according to claim 7, wherein the second portion has a black color.

11. An image reading apparatus according to claim 10, wherein the correction coefficient is greater for the second portion than for the first portion.

12. An image reading apparatus according to claim 10, wherein, when (R*G*B) for the second portion is denoted by $(R*G*B)_b$ and (R*G*B) for the white portion is denoted by $(R*G*B)_w$, the relationship $(R*G*B)_b \leq$ and $(R*G*B)_w$ holds.

13. An image reading apparatus according to claim 7, wherein
the image processing comprises show-through reduction processing, and
said determining unit determines the correction coefficient for the show-through reduction processing.

14. An image reading apparatus according to claim 7, wherein said sheet thickness detecting unit comprises a sensor emitting part and a sensor receiving part.

15. An image reading apparatus according to claim 14, wherein said sheet thickness detecting unit comprises an infrared sensor.

16. An image reading apparatus according to claim 14, wherein said sheet thickness detecting unit comprises an ultrasonic sensor.

17. An image reading apparatus according to claim 7, wherein the correction coefficient is settable from the outside of said image reading apparatus.

18. An image reading apparatus comprising:
an image reading unit adapted to read an RGB image of an original being conveyed;
a background member, comprising a first portion having a white color and a second portion having a different color from the white color, each of which is used to form a background color in the RGB image of the original read by said image reading unit;
a background color changing unit adapted to position said background member such that one of the first portion and the second portion is disposed opposite said image reading unit
a selecting unit adapted to select a type of image processing to be performed to the RGB image, depending on which portion of said background member is disposed opposite said image reading unit;
a determining unit adapted to determine the correction coefficient for the selected type of image processing regardless of the original, wherein the correction coefficient and values of the RGB image uniquely define the selected type of image processing; and
wherein said image processing is performed using the following expression $$R' = R + \gamma_R \times \frac{(R \times G \times B)}{255^3}$$
$$G' = G + \gamma_G \times \frac{(R \times G \times B)}{255^3}$$
$$B' = B + \gamma_B \times \frac{(R \times G \times B)}{255^3}$$

for calculating an output value (R', G', B') for an input value (R, G, B) based on the correction coefficient ($\gamma_R, \gamma_G, \gamma_B$).

* * * * *